United States Patent
Baek

(10) Patent No.: US 8,790,820 B2
(45) Date of Patent: Jul. 29, 2014

(54) SECONDARY BATTERY AND METHOD OF MANUFACTURING THE SAME

(75) Inventor: Woon-Seong Baek, Suwon-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 444 days.

(21) Appl. No.: 12/923,522

(22) Filed: Sep. 27, 2010

(65) Prior Publication Data

US 2011/0129698 A1     Jun. 2, 2011

(30) Foreign Application Priority Data

Nov. 27, 2009   (KR) .................. 10-2009-0115726

(51) Int. Cl.
  *H01M 2/02*    (2006.01)
  *H01M 2/04*    (2006.01)
  *H01M 2/08*    (2006.01)
  *H01M 6/12*    (2006.01)

(52) U.S. Cl.
  USPC ............ 429/177; 429/176; 429/185; 429/162

(58) Field of Classification Search
  CPC ............ H01M 2/0217; H01M 2/0207; H01M 2/0202; H01M 2/02
  USPC .................................. 429/177, 176, 185, 162
  See application file for complete search history.

(56) References Cited

U.S. PATENT DOCUMENTS

| | | |
|---|---|---|
| 2006/0216585 A1 | 9/2006 | Lee |
| 2008/0054849 A1 | 3/2008 | Kim |
| 2008/0226972 A1 * | 9/2008 | Kwag et al. ................... 429/121 |
| 2009/0098417 A1 | 4/2009 | Yamada et al. |

FOREIGN PATENT DOCUMENTS

| | | |
|---|---|---|
| JP | 2008-198464 A | 8/2008 |
| JP | 2009-043497 A | 2/2009 |
| KR | 10 2006-0103693 A | 10/2006 |
| KR | 10 2008-0020317 A | 3/2008 |

OTHER PUBLICATIONS

Korean Office Action in KR 10-2009-0115726, dated Apr. 22, 2011 (Baek).

Office Action issued in corresponding Korean application, 10-2009-0115726, dated Jul. 12, 2012.

* cited by examiner

*Primary Examiner* — Helen O Conley
(74) *Attorney, Agent, or Firm* — Lee & Morse, P.C.

(57) ABSTRACT

A secondary battery and a method of manufacturing the same, the secondary battery including a bare cell for charging and discharging electricity; a protective circuit module for protecting the bare cell; an upper case, the upper case being coupled to the protective circuit module and disposed at an upper part of the bare cell; a protective film surrounding an external surface of the bare cell; and a resin molding unit disposed in the protective film, in the upper case, and in a lower part and on a bottom surface of the bare cell.

13 Claims, 4 Drawing Sheets

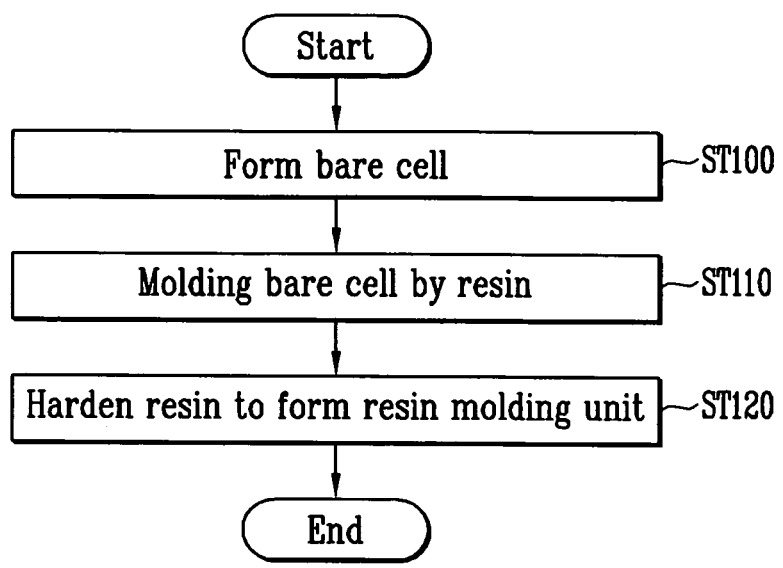

SECONDARY BATTERY AND METHOD OF MANUFACTURING THE SAME

BACKGROUND

1. Field

Embodiments relate to a secondary battery and a method of manufacturing the same.

2. Description of the Related Art

In general, a secondary battery refers to a chargeable and dischargeable battery, unlike a non-chargeable primary battery. Secondary batteries may be used for a portable electronic product, e.g., a mobile telephone, a laptop computer, and a camcorder. Secondary batteries may include, e.g., nickel-cadmium secondary batteries, nickel-hydrogen secondary batteries, and lithium ion secondary batteries. The lithium ion secondary battery may have higher operation voltage and energy density per unit weight than the nickel-cadmium secondary battery and the nickel-hydrogen secondary battery. Accordingly, the lithium ion secondary battery is more widely used than the other secondary batteries.

In the positive electrode plate of the lithium ion secondary battery, e.g., lithium oxide, may be used as an active material layer. In the negative electrode plate, e.g., a carbon material may be used as an active material layer. A non-aqueous liquid electrolyte including, e.g., an organic solvent or a solid polymer electrolyte, may be used in a lithium ion secondary battery. A secondary battery including a polymer electrolyte may be classified as a lithium ion polymer battery.

In addition, lithium ion secondary batteries may include, e.g., cylinder type batteries and prismatic type batteries, in which jelly-roll type electrode assemblies are mounted in a cylindrical can or a prismatic can, respectively. Lithium secondary batteries may also include pouch type batteries in which a jelly-roll type electrode assembly may be mounted in a pouch type case corresponding to a shape of a battery case.

A manufacturing processes of the lithium ion secondary battery may be divided into a first part including forming a bare cell and a second part including attaching a label to the bare cell and molding parts of the bare cell and the label with resin to form a lower case.

In the second part, attaching the label and formation of the lower case may be performed separately. Therefore, the second part may take a long time, including, e.g., the time required for attaching the label and the time required for forming the lower case.

SUMMARY

Embodiments are directed to a secondary battery and a method of manufacturing the same, which represent advances over the related art.

It is a feature of an embodiment to provide a secondary battery capable of being formed by a simplified process, thereby reducing manufacturing time thereof.

At least one of the above and other features and advantages may be realized by providing a secondary battery including a bare cell for charging and discharging electricity; a protective circuit module for protecting the bare cell; an upper case, the upper case being coupled to the protective circuit module and disposed at an upper part of the bare cell; a protective film surrounding an external surface of the bare cell; and a resin molding unit disposed in the protective film, in the upper case, and in a lower part and on a bottom surface of the bare cell.

The resin molding unit may be disposed on sides of the upper case and on sides of the bare cell.

The protective film may not be directly attached to the bare cell.

The bare cell may include an electrode assembly formed by winding a positive electrode plate, a negative electrode plate, and a separator, and an external case in which the electrode assembly is mounted, and wherein the external case is a pouch.

The protective film may be a metal film.

The secondary battery may further include an exterior film surrounding the protective film.

At least one of the above and other features and advantages may also be realized by providing a method of packing a secondary battery including assembling a protective circuit module and an upper case with a bare cell; surrounding an external circumference of the bare cell with a protective film; injecting resin into the upper case, the protective film, and a bottom surface and a lower part of the bare cell; and forming a resin molding unit such that the resin molding unit is disposed in the upper case, in the protective film, and in a lower part and on a bottom surface of the bare cell.

The method may further include forming an exterior film surrounding the protective film.

The bare cell may include an electrode assembly and an external case, the external case being a pouch.

Surrounding the external circumference of the bare cell with the protective film may include attaching the protective film to at least one of front and back surfaces of the bare cell such that the molding unit is formed only on sides of the upper case and on sides of the bare cell.

Surrounding the external circumference of the bare cell with the protective film may not include directly attaching the protective film to the bare cell.

The resin molding unit may be integrally formed on sides, front, and back surfaces of the bare cell.

The protective film may be a metal film.

BRIEF DESCRIPTION OF THE DRAWINGS

The above and other features and advantages will become more apparent to those of ordinary skill in the art by describing in detail exemplary embodiments with reference to the attached drawings, in which:

FIG. 4 illustrates a flowchart of a process for forming the secondary battery according to an embodiment.

DETAILED DESCRIPTION

Figure 1:
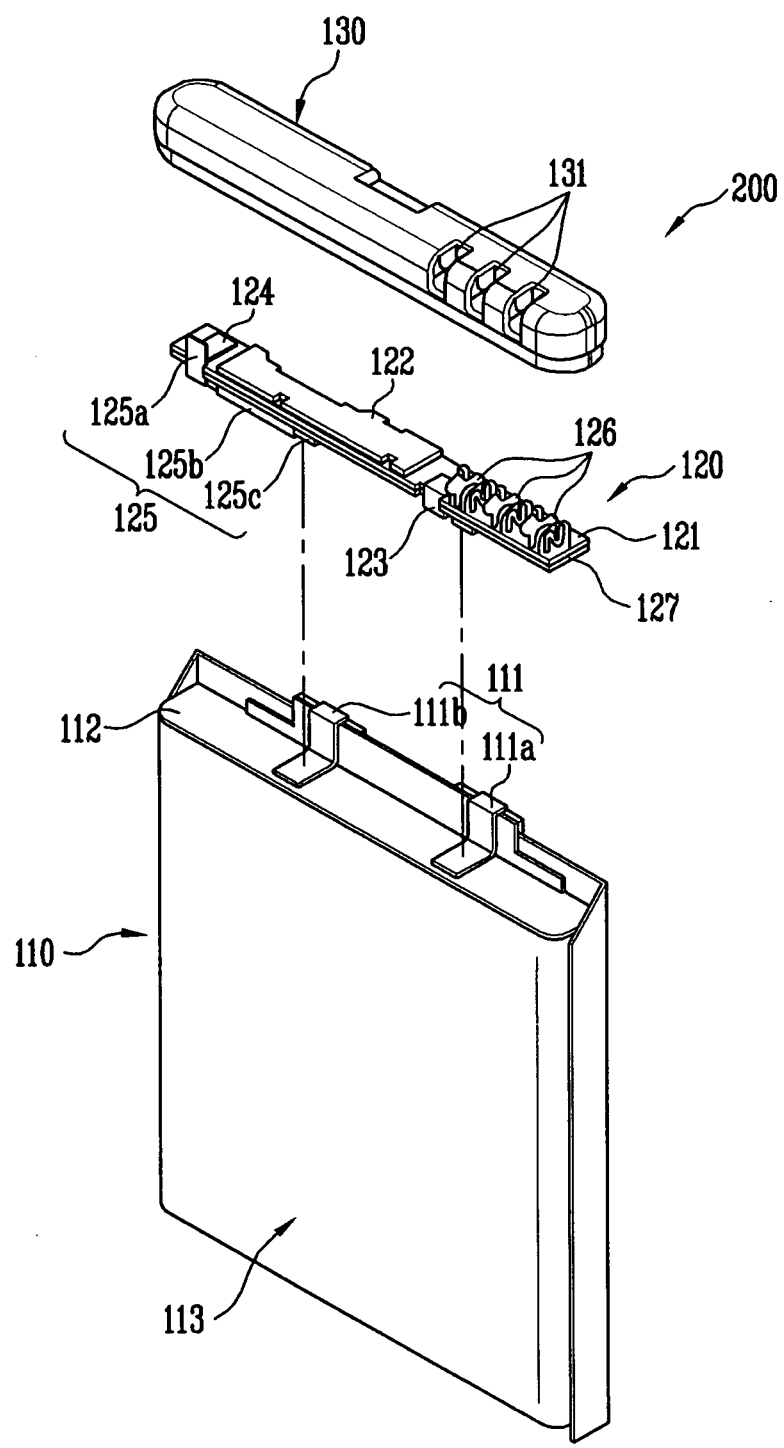
FIG. 1 illustrates an exploded perspective view of a secondary battery according to an embodiment.

Korean Patent Application No. 10-2009-0115726, filed on Nov. 27, 2009, in the Korean Intellectual Property Office, and entitled: "Secondary Battery and Method for Packing the Same" is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another element, it can be directly on the other element, or intervening elements may also be present. Further, it will be understood that when an element is referred to as being "under" another element, it can be directly under, and one or more intervening elements may also be present. In addition, it will also be understood that when an element is referred to as being "between" two elements, it can be the only element between the two elements, or one or more intervening elements may also be present. Like reference numerals refer to like elements throughout.

Figure 2:
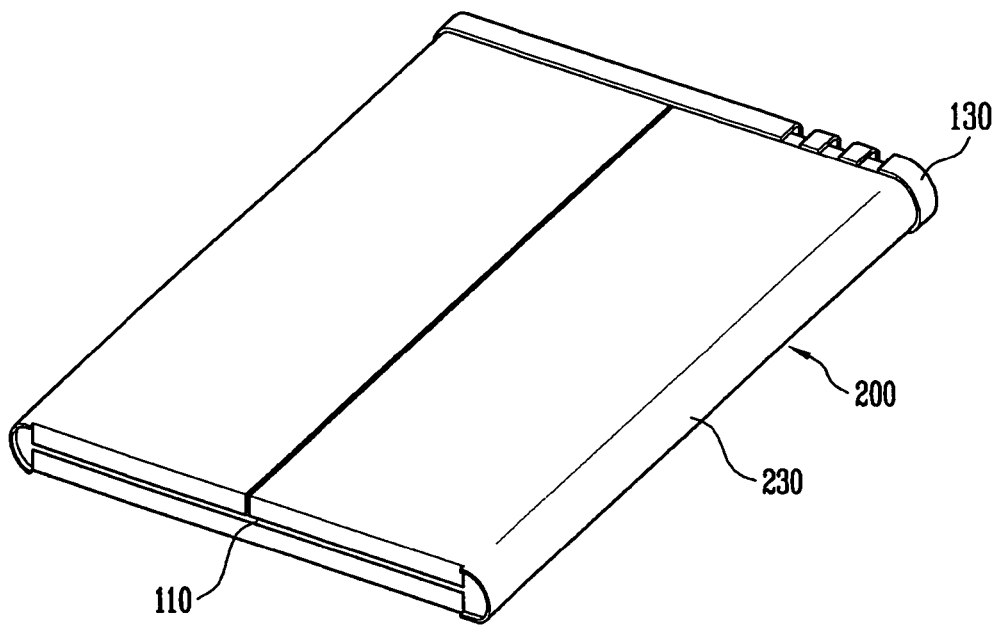
FIG. 2 illustrates a perspective view of the secondary battery of FIG. 1 in an assembled state.

FIG. 1 illustrates an exploded perspective view of a secondary battery according to an embodiment. FIG. 2 illustrates a perspective view of the secondary battery of FIG. 1 in an assembled state. Referring to FIGS. 1 and 2, a secondary battery 200 may include a bare cell 110, a protective circuit module 120, and an upper case 130.

The bare cell 110 may include an electrode assembly (not shown), an electrode terminal 111, and a first insulating tape 112. The bare cell 110 may include a pouch-type case 113. A positive electrode plate (not illustrated) and a negative electrode plate (not illustrated) with a separator (not illustrated) therebetween may be wound in the form of a jelly-roll structure to form the electrode assembly.

The electrode terminal 111 may include a first electrode terminal 111a and a second electrode terminal 111b.

The first electrode terminal 111a and the second electrode terminal 111b may be exposed at an end of the bare cell 110. The first electrode terminal 111a may be electrically coupled to one of the positive electrode plate or a negative electrode plate and thus may be electrically negative or positive. In a process of assembling the secondary battery 200, the first electrode terminal 111a may be electrically coupled to the protective circuit module 120 and also may be curved along a surface of the bare cell 110.

The second electrode terminal 111b may be electrically coupled to the other of the positive electrode plate or the negative electrode plate to thereby have an electrically opposite polarity to the first electrode terminal 111a. The second electrode terminal 111b may be electrically coupled to the protective circuit module 120 in the process of assembling the secondary battery 200 and may also be curved along one surface of the bare cell 110.

The first insulating tape 112 may be positioned between a surface of the bare cell 110 and the first and second electrode terminals 111a and 111b. The first insulating tape 112 may be, e.g., a double stick tape, and may fix the first and second electrode terminals 111a and 111b curved along the surface of the bare cell 110.

The protective circuit module 120 may include a substrate 121, a protective circuit unit 122, a lead plate 123, a tab 124, a fuse 125, an external terminal 126, and a second insulating tape 127. The protective circuit module 120 may protect the bare cell 110 from, e.g., overcharge and overdischarge.

The protective circuit unit 122, the lead plate 123, the tab 124, the fuse 125, and the external terminal 126 may be electrically coupled to the substrate 121.

The protective circuit unit 122 may include a switching element and may open a circuit during, e.g., overcharge or overdischarge, to protect the secondary battery 200.

The lead plate 123 may extend from the substrate 121 toward the bare cell 110 and may be electrically coupled to the first electrode terminal 111a. The lead plate 123 may be coupled to the first electrode terminal 111a during assembly of the secondary battery 200 and may be bent toward a lower surface of the substrate 121.

The tab 124 may extend from the substrate 121 toward an upper part of the protective circuit module 120. One side of the tab 124 may be electrically coupled to the fuse 125.

The fuse 125 may include a first lead 125a, a main body 125b, and a second lead 125c. The first lead 125a may extend from one end of the main body 125b to be electrically coupled to the tab 124. The main body 125b may sense heat from the bare cell 110 and may be electrically opened when a temperature of the bare cell 110 is greater than a predetermined temperature. The second lead 125c may extend from another end of the main body 125b to be electrically coupled to the second electrode terminal 111b.

After the second lead 125c is coupled to the second electrode terminal 111b during assembly of the secondary battery 200, the main body 125b and the second lead 125c of the fuse 125 may be bent toward the lower surface of the substrate 121.

The external terminal 126 may be coupled to an external apparatus when the secondary battery 200 is charged or discharged.

The second insulating tape 127 may be positioned under the substrate 121 to electrically insulate the substrate 121 from the lead plate 123. The second insulating tape 127 may also electrically insulate the substrate 121 from the fuse 125.

The upper case 130 may be formed by, e.g., injection molding, and may include accommodating units (not shown) corresponding to the protective circuit unit 122, the tab 124, and the external terminal 126. The upper case 130 may accommodate therein the protective circuit unit 122, the tab 124, and the external terminal 126 of the protective circuit module 120. An opening 131 may expose the external terminal 126 to the outside when the protective circuit module 120 is coupled, i.e., assembled, with the upper case 130.

The bare cell 110 may be, e.g., a pouch type. However, the embodiments are not limited to the above description. In an implementation, the bare cell may have a structure suitable for forming, e.g., a prismatic type secondary battery.

Referring to FIG. 2, the secondary battery 200 including the assembled bare cell 110, protective circuit module 120, and upper case 130 may be surrounded by a protective film, sheath, or envelope 230. In an implementation, the protective film 230 may be made of, e.g., a metal material.

Figure 3A:
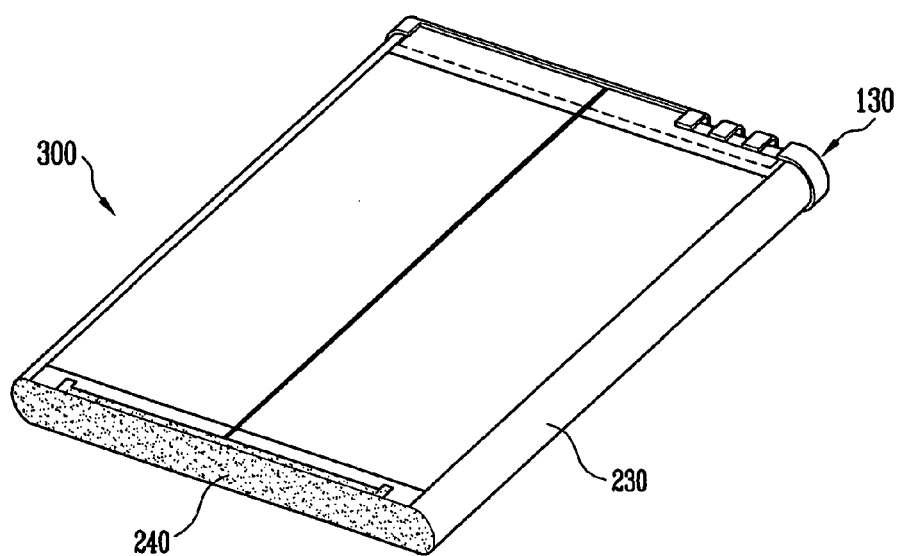
FIG. 3A illustrates a perspective view of a secondary battery including resin molded thereto.
Figure 3B:
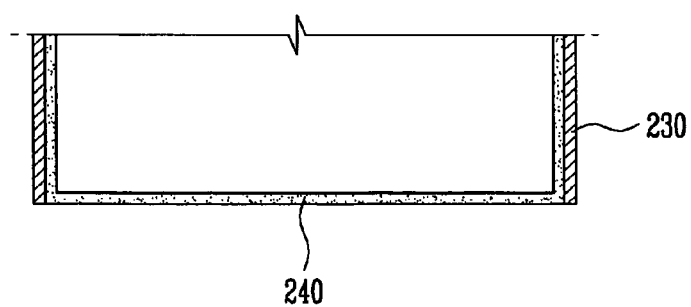
FIG. 3B illustrates a sectional view of a lower part of the secondary battery of FIG. 3A.

FIG. 3A illustrates a perspective view of a secondary battery formed by molding resin thereto. FIG. 3B illustrates a sectional view of a lower part of the secondary battery of FIG. 3A.

Referring to FIGS. 2, 3A, and 3B, the protective film 230 may surround the bare cell 110. Then, resin may be injected and heat may be applied such that a resin molding unit 240 may be formed in spaces between the bare cell 110 and the protective film 230 and between the bare cell 110 and the upper case 130. In addition, the resin molding unit 240 may be formed on a bottom surface of the bare cell 110 and in a lower part of the bare cell 110 not covered with the protective film 230. Accordingly, the protective film 230 and the upper case 130 may be fixed to the bare cell 110 by the resin molding unit 240. In addition, because the resin molding unit 240 may be formed on the bottom surface of the bare cell 110 and in the lower part of the bare cell 110, the bottom surface of and the bare cell 110 and the lower part of the bare cell 110 may be protected by the resin molding unit 240. Thus, a separate lower case for protecting the lower part and the bottom surface of the bare cell 110 may not be necessary due to the presence of the resin molding unit 240.

A dimension of the protective film 230 may be longer than an external circumference of the bare cell 110 such that the protective film 230 may not be attached to the external circumference of the bare cell 110 but rather may be separated from an external surface of the bare cell 110. Therefore, a predetermined space may be present between the protective film 230 and the bare cell 110 so that resin may be easily injected therein. Thus, upon formation of the resin molding unit 240, the protective film may be indirectly attached to the bare cell 110.

In another implementation, the protective film 230 may be attached to front and/or rear surfaces of the bare cell 110. But, the protective film 230 may not be attached to sides of the bare cell 110. With such an arrangement, as illustrated in FIG. 3B, the resin molding unit 240 formed on the bottom surface and in the lower part of the bare cell 110 may be coupled to, i.e., integrated with, the resin molding unit 240 formed between the upper case 130 and the bare cell 110 by the resin molding unit 240 formed along the sides of the bare cell 110.

FIG. 4 illustrates a flowchart of a method of forming the secondary battery according to an embodiment. Referring to FIG. 4, the protective circuit module 120 and the upper case 130 may be assembled with the bare cell 110. When the upper case 130 is assembled with the protective circuit module 120, the external terminal 126 of the protective circuit module 120 may be exposed to the outside through the opening 131 of the upper case 130. Then, sides of the bare cell 110 may be surrounded by the protective film 230 to form the secondary battery 200. The protective film 230 may be longer than the external circumferential surface of the bare cell 110 such that the protective film 230 may not be attached to the external circumferential surface of the bare cell 110 (ST 100). In another implementation, the protective film 230 may be attached to the front and/or rear surface of the bare cell 110.

The secondary battery 200 including the bare cell 110 with the protective circuit module 120, upper case 130, and protective film 230 thereon may be molded by resin. The resin may be heated and then injected, filling spaces between the bare cell 110 and the upper case 130 and between the bare cell 110 and the protective film 230. As described above, the protective film 230 may be attached to the front and/or rear surface of the bare cell 110. As also described above, the protective film 230 may not necessarily be attached to side, external circumferential surfaces of the bare cell 110. Therefore, resin may permeate into the sides, the bottom surface, and the lower part of the bare cell 110 (ST 110). In addition, if the protective film 230 is not directly attached to the bare cell 110 at all or only to the front and/or back surfaces, the resin may permeate to the front and/or back of the bare cell 110 as well as the sides. In other words, the resin may permeate into areas where the protective film 230 is not directly attached to the bare cell 110.

The resin may harden, thus forming the resin molding unit 240. The resin molding unit 240 may function as an adhesive, fixing the assembled protective circuit module 120, the upper case 130, and the protective film 230 to the bare cell 110. The resin molding unit 240 may also function as the lower case for protecting the lower part and the bottom surface of the bare cell 110. In an implementation, an exterior film may wrap the secondary battery 200 after formation of the resin molding unit 240 (ST 120).

In the secondary battery according to an embodiment, since the lower case may be formed using the resin molding unit, an additional lower case attaching process is not necessary. Therefore, the time necessary to manufacture the secondary battery may be reduced.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A secondary battery, comprising:
    a bare cell for charging and discharging electricity, the bare cell including:
        an electrode assembly formed by winding a positive electrode plate, a negative electrode plate, and a separator, and
        an external case in which the electrode assembly is mounted, the external case being a pouch;
    a protective circuit module for protecting the bare cell;
    an upper case, the upper case being coupled to the protective circuit module and disposed at an upper part of the bare cell;
    a protective film surrounding an external surface of the external case; and
    a resin molding unit, the resin molding unit being different from the pouch and being disposed:
        in between the protective film and the external surface of the external case,
        in the upper case, and
        in a lower part and on a bottom surface of the bare cell.

2. The secondary battery as claimed in claim 1, wherein the resin molding unit is disposed on sides of the upper case and on sides of the bare cell.

3. The secondary battery as claimed in claim 1, wherein the protective film is not directly attached to the bare cell.

4. The secondary battery as claimed in claim 1, wherein the protective film is a metal film.

5. A method of packing a secondary battery, comprising:
    assembling a protective circuit module and an upper case with a bare cell, the bare cell including an electrode assembly and an external case, the external case being a pouch;
    surrounding an external circumference of the bare cell with a protective film;
    injecting resin into the upper case, the protective film, and a bottom surface and a lower part of the bare cell; and
    forming a resin molding unit such that the resin molding unit is different from the pouch and is disposed:
        in the upper case,
        in between the protective film and an external surface of the external case, and
        in the lower part and on the bottom surface of the bare cell.

6. The method as claimed in claim 5, wherein surrounding the external circumference of the bare cell with the protective film includes attaching the protective film to at least one of front and back surfaces of the bare cell such that the molding unit is formed only on sides of the upper case and on sides of the bare cell.

7. The method as claimed in claim 5, wherein surrounding the external circumference of the bare cell with the protective film does not include directly attaching the protective film to the bare cell.

8. The method as claimed in claim 7, wherein the resin molding unit is integrally formed on sides, front, and back surfaces of the bare cell.

9. The method as claimed in claim 5, wherein the protective film is a metal film.

10. The secondary battery as claimed in claim 1, wherein the protective film and the upper case are fixed to the bare cell by the resin molding unit.

11. The secondary battery as claimed in claim 1, wherein the protective film is spaced from the external surface of the bare cell.

12. The secondary battery as claimed in claim 1, wherein the resin molding unit is integrally formed.

13. The secondary battery as claimed in claim 1, wherein the secondary battery has a structure in which the protective film is directly on the resin molding unit, and the resin molding unit is directly on the pouch of the bare cell.

* * * * *